(12) United States Patent
Meyer

(10) Patent No.: US 10,250,486 B2
(45) Date of Patent: Apr. 2, 2019

(54) SYSTEM AND METHOD FOR ISOCHRONOUS SWITCHING OF PACKETIZED MEDIA STREAMS

(71) Applicant: GVBB HOLDINGS S.A.R.L., Luxembourg (LU)

(72) Inventor: Charles S. Meyer, Crystal Bay, NV (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 75 days.

(21) Appl. No.: 15/294,549

(22) Filed: Oct. 14, 2016

(65) Prior Publication Data

US 2018/0109441 A1 Apr. 19, 2018

(51) Int. Cl.
*H04J 3/06* (2006.01)
*H04L 12/707* (2013.01)
*H04L 29/06* (2006.01)
*H04L 12/701* (2013.01)
*H04L 12/743* (2013.01)

(52) U.S. Cl.
CPC ............ *H04L 45/22* (2013.01); *H04J 3/0667* (2013.01); *H04L 45/00* (2013.01); *H04L 65/608* (2013.01); *H04L 69/22* (2013.01); *H04L 45/7453* (2013.01); *H04L 45/7457* (2013.01)

(58) Field of Classification Search
CPC ........ H04J 3/0667; H04L 45/00; H04L 45/22; H04L 45/7453; H04L 45/7457; H04L 65/608; H04L 69/22
See application file for complete search history.

(56) References Cited

U.S. PATENT DOCUMENTS

| | | |
|---|---|---|
| 6,430,179 B1 | 8/2002 | Meyer |
| 7,116,894 B1 | 10/2006 | Chatterton |
| 2003/0126294 A1* | 7/2003 | Thorsteinson .... H04L 29/06027 709/247 |
| 2008/0219381 A1* | 9/2008 | Karaoguz ............. H04L 1/0054 375/316 |
| 2013/0142055 A1* | 6/2013 | Bao .................... H04W 36/0011 370/252 |
| 2013/0346564 A1 | 12/2013 | Warrick et al. |
| 2017/0331926 A1* | 11/2017 | Raveh ...................... H04L 69/14 |

FOREIGN PATENT DOCUMENTS

EP 2352289 A1 8/2011

OTHER PUBLICATIONS

International Search Report & Written Opinion issued in PCT/EP2017/076183 dated Dec. 22, 2017.

* cited by examiner

*Primary Examiner* — Asad M Nawaz
*Assistant Examiner* — Zhaohui Yang
(74) *Attorney, Agent, or Firm* — Arent Fox LLP

(57) ABSTRACT

An IP router capable of isochronous switching of a packetized media stream. According to an example, the IP router parses the RTP header within an incoming IP datagram to extract the RTP time stamp, which provides a time value for a unique IP Flow. By inspecting the header, the IP router can switch the flow at the point in time that the RTP time stamp value changes, or matches a target value. In one aspect, the IP router looks for the change in the RTP time stamp value and performs the switch based on the detected change. In another aspect, the IP router performs the switch at a specified time stamp value that can be unique to a group of signals or based on a common "sync" value published to all the ports of the IP router.

16 Claims, 7 Drawing Sheets

SYSTEM AND METHOD FOR ISOCHRONOUS SWITCHING OF PACKETIZED MEDIA STREAMS

TECHNICAL FIELD

The system and method disclosed herein relates to the transmitting of media streams, and, more particularly, to a system and method for isochronous switching of packetized media streams.

BACKGROUND

As media production migrates to packet based data infrastructure, the industry's need to switch cleanly within this infrastructure, or fabric, continues to increase.

In general, television production requires a clean transition between sources, which is a practice that is well documented in the recommend practice SMPTE RP-168 (i.e., "for synchronizing video switching defined vertical interval switching point"). For RP-168, infrastructures assume that all sources for a common video frame rate are co-timed to a master clock, typically color black, or tri-level sync, and signals are managed within the facility to be in tight phase alignment, e.g., much less than one half line of video. While existing technologies developed by the current Applicant have provided for switching these new, packetized signals "on the wire", in the packetized domain, the signals must still be co-timed.

Moreover, it is known in this industry that a vertical switch is a break-make switch that occurs instantly, during the vertical blanking interval. A clean switch requires that two video sources be present at some point in the system, typically at the receiver located at the edge, or endpoint, of the network. Moreover, to perform the clean switch, these two signals must be present for some period of time, for example, one frame or a significant portion of a frame of video. There are a number of compromised ways to emulate the vertical switch. These methods differ based on how much delay is added to the video signals, how much bandwidth is required, how long the additional bandwidth is required, and how quickly the switch can be made, based upon initiating the request to switch and the like.

Due to advances in the current technologies, existing IP routers rarely, if ever, fragment packets. But even with this improvement in routing technologies, there is still a challenge in that existing IP routers will change routes based on an Internet Group Management Protocol ("IGMP") command sequence, a standard route change request which is in-band, or an Software-Defined Network ("SDN") command. In all cases, the request to make the change and the instant at which the change is made, are unaware of the vertical interval. As a result, the switch is highly likely to occur during the active portion of the picture, which is not desirable since the switch will be perceived by the viewer, as visible artifacts or "glitching".

To address this issue, the current Applicant has also designed a scalable physical layer flow processor for packetized media that facilitates packet switching to be vertically accurate. This technique is described in U.S. Patent Provisional Application No. 62/385,205, filed Sep. 8, 2016, the entire contents of which are hereby incorporated by reference. As described therein, the system changes memory read pointer values at the vertical interval. However, this approach still requires upstream orchestration of the IP router to generate the pre-select, and there are two signals such that twice the bandwidth is consumed at least for some time.

To further complicate the switching process, it is necessary to consider that modern switch designs favors a leaf-and-spine architecture for larger facilities, or even within the chassis of a modular router. In fact, this design is now the de-facto topology for data centers and Content Data Networks ("CDNs"). In this case, it becomes important to sequence the switch action of three pieces of equipment: the leaf router, the spine router, and then the leaf router, or three modules: I/O then fabric then I/O. U.S. Pat. No. 6,430,179, entitled "Three Stage Router for Broadcast Application", which is hereby incorporated by reference, explains this sequencing's importance and provides a solution for legacy, SDI type signals.

Recently, certain router designs have been proposed to change the port address in the IP 5-tuple, which is a set of five different values that comprise a transmission control protocol/Internet protocol (TCP/IP) connection, including a source IP address/port number, a destination IP address/port number and the protocol in use. For example, one existing design inspects the User Datagram Protocol ("UDP") port address, and then executes an action based upon a change in value to execute a vertically accurate switch. However, this design requires significant orchestration with every piece of source equipment that feeds the data to the router. As a result, each device must be queued in advance with the correct new port address, so that at the next vertical interval, which the source device deduces from an externally applied reference, the port address can be changed by the source equipment to include the new destination address. It is understood that the overhead cost for implementing such a system is significantly high and it implies that every source device must comply with some control standard for this capability.

Adoption of this technology seems highly unlikely as every source device would need to be customized to perform the necessary switching. Additionally, there is a problem with adding a destination to this source, i.e., having a new join command add a destination to a current multicast group. The port address cannot necessarily change, so the router cannot easily determine how to start forwarding packets to a new address. Moreover, if IGMP is used, then there is no way to indicate at what instant in time the join command should occur.

Accordingly, there is a need for a system and method that facilitates data flow switches at more precise times without double bandwidth scaling.

SUMMARY

To address the above-mentioned limitations of the existing technology, a method and system is disclosed herein for isochronous switching of packetized media. In particular, the method and system parses the RTP header within the IP datagram to extract the RTP time stamp, which provides a time value for a unique IP Flow. Thus, by inspecting the header, it is possible to switch the flow at the point in time that the RTP time stamp value changes, or matches a target value. In one aspect, the system and method simply looks for the change in the RTP time stamp value, and performs the switch based on the detected change. In another aspect, the switch is performed at a specified time stamp value that can be unique to a group of signals or based on a common "sync" value published to all the ports.

To perform the switch, the packet forwarding algorithm must change. Packet forwarding will occur based on the value of the header address, but in different ways. If the value changes, from its previous value, the forwarding address could change. If the value matches a reference value, the forwarding address, or addresses could change. Preferably, this forwarding occurs at the input port of the IP router where the data plane gains access to the signal. In some cases, certain operations might be supported in the control plane. For example, some IP routers forward port data via the control plane to a secondary processor that is considered part of the control plane, for multi-cast replication, as an example. The addresses are managed correctly, based on the map table stored in the HASH, or T-CAM, memory of the control plane, and replicated flows are then forwarded to all the necessary ports in the router.

Thus, according to an exemplary embodiment, a method is disclosed for isochronous switching of packetized media. In this aspect, the method includes receiving at least one packetized media stream by an input port of an IP packet router; parsing, by the IP packet router, RTP header information of a frame of the at least one packetized media stream to identify an RTP time stamp; detecting a change in the RTP time stamp; and when a change in the RTP time stamp is detected, rerouting the at least one packetized media stream to an output port of the IP packet router.

According to another exemplary aspect, an IP packet router is provided for isochronous switching of packetized media. In this aspect, the IP packet router includes at least one input port configured to receive at least one packetized media stream by an input port of an IP packet router; at least one output port communicatively coupled to a destination device; and at least one RTP parser coupled to the at least one input port and configured to parse RTP header information of a frame of the at least one packetized media stream to identify an RTP time stamp; and processor configured to detect a change in the RTP time stamp and, when a change in the RTP time stamp is detected, control a rerouting of the at least one packetized media stream to the at least one output port.

According to another exemplary aspect, a system is provided for isochronous switching of packetized media. In this aspect, the system includes a controller configured for generating a command stream to control the isochronous switching. Moreover, the system further includes an IP packet router communicatively coupled to the controller to perform the isochronous switching based on the command stream, the IP packet router including: at least one input port configured to receive at least one packetized media stream from an input port of an IP packet router; at least one output port communicatively coupled to a destination device; and at least one RTP parser coupled to the at least one input port and configured to parse RTP header information of a frame of the at least one packetized media stream to identify an RTP time stamp; and processor configured to detect a change in the RTP time stamp and, when a change in the RTP time stamp is detected, control a rerouting of the at least one packetized media stream to the at least one output port.

In a refinement of this aspect, the processor of the IP packet router is further configured to, upon receiving the at least one packetized media stream by the input port, control a routing of the at least one packetized media stream to a first output port of the IP packet router; and upon detecting a change in the RTP time stamp, control the rerouting of the at least one packetized media stream to a second output port of the IP packet router.

In another aspect, the controller is configured to transmit the command stream as a data table that includes a trigger value and a new forwarding address for the output port of the IP packet router that is associated with the trigger value.

In a further aspect, the processor of the IP packet router is further configured to determine a value of the RTP time stamp when the change of the RTP time stamp is detected; compare the value of the RTP time stamp with the trigger value; and control the rerouting of the at least one packetized media stream to the output port of the IP packet router when the value of the RTP time stamp matches the trigger value.

In yet an additional aspect, the processor of the IP packet router is further configured to control the rerouting of the at least one packetized media stream by replacing a current forwarding address for the at least one packetized media stream with the new forwarding address.

Furthermore, in one aspect the controller generates the trigger value based on a precision time protocol synchronization signal. Moreover, the controller can generate the command stream for the rerouting the at least one packetized media stream to the at least one output port based on at least one of an IGMP command and an SDN command.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
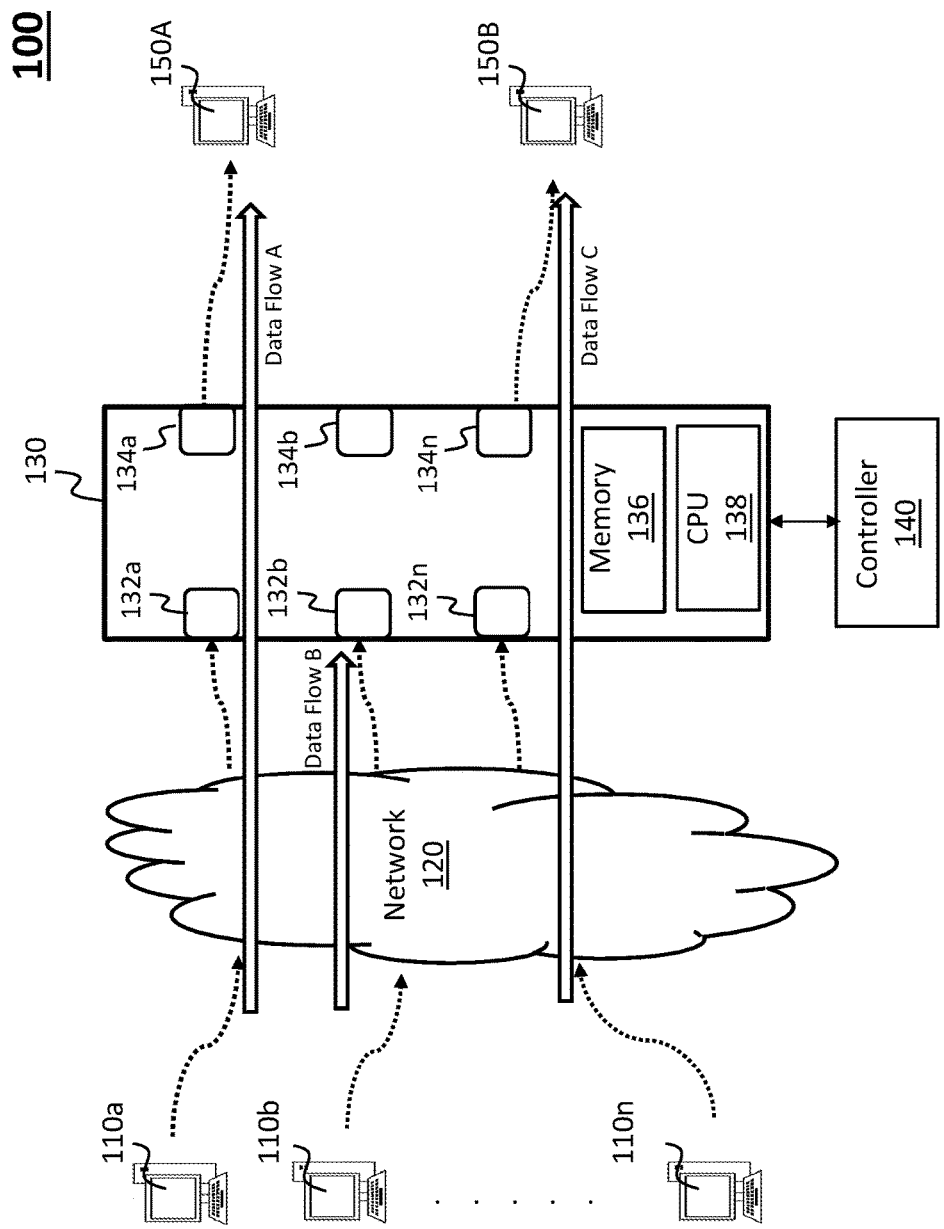
FIG. 1 illustrates a block diagram of a system for isochronous switching of packetized media according to an exemplary embodiment.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1 illustrates a block diagram of a system for isochronous switching of packetized media according to an exemplary embodiment. In the exemplary aspect, the system 100 provides a video switching network that facilitates vertically accurate and time accurate transition between data flows. As shown, the system 100 includes a controller 140, and one or more IP packet routers 130, such as an Ethernet video router (or switch) having a plurality of ports. In general, the controller 140 can be considered to function as part of the "control plane" architecture of system 100 which controls the routing protocols of incoming media packets. As will be described in detail below, the controller 140 controls the forwarding addresses for data flows incoming to the IP router 130 as well as the outgoing interfaces associated with them. Moreover, the control plane logic also can define certain packets to be discarded, as well as preferential treatment of certain packets for which a high quality of service is defined by such mechanisms as differentiated services.

In the illustrated embodiment, the IP router 130 is shown to have three input ports 132a, 132b, . . . 132n and three output ports 134a, 134b, . . . 134n. Moreover, the input ports 132a, 132b, . . . 132n can be any type of input ports capable of receiving packetized media streams, such as Ethernet MAC ports, from one or a plurality of networks 120 (e.g., TCP/IP or UDP networks). Moreover, it should be appreciated that while only three physical ports are shown, the disclosed IP router 130 is in no way limited to only three ports and the concept is extensible to more than that, limited only by memory access speed.

In the exemplary embodiment, the input ports 132a, 132b . . . 132n can receive unique data flows and/or redundant data flows using the SMPTE 2202-7, for example. It is noted that the terms data flow and media stream are used interchangeably herein. As shown, the system 100 includes a first source of packetized media data (source of data flow A) 110a, which will have a first source IP address, and is shown as being received by input port 132a via network 120. Moreover, the system 100 includes a second source of packetized media data (source of data flow B) 110b, which will have a second source IP address, and is shown as being received by input port 132b via network 120. Furthermore, the system 100 includes a third source of packetized media data (source of data flow C) 110n, which will have a third source IP address, and is shown as being received by input port 132n via network 120.

As will be described in detail below, the controller 140 is configured to control the IP router 130 to route and switch data flows from data sources 110a, 110b . . . 110n to one or more destination devices (e.g., SDI and MADI devices). In the illustrated example, IP router 130 is outputting data flow A to destination device 150A and data flow C to destination device 150B. Moreover, data flow B is not currently being output by IP router 130. The control of the packetized media streams to the different destination devices 150A and 150B is defined by forwarding addresses transmitted from controller 140 to IP router 130 and stored in memory 136, for example. It should be appreciated that while only two data flows A and B are illustrated in the exemplary embodiment, the IP router 130 can handle additional data flows and is only limited by its hardware constraints, as noted above.

Thus, as shown, controller 140 is communicatively coupled to the IP router 130 and configured to provide data and commands to the IP router 130 that define which input port 132a, 132b . . . 132n is to be communicatively coupled to which output ports 134a, 134b . . . 134n, thereby allowing packetized video data to flow from one or more sources 110a-110n to one or more destinations 150A-150B. It should be appreciated that data may flow from a single source to multiple destination devices (e.g., multicasting techniques), or to one destination device from multiple sources. For example, a destination device (e.g., 150A) attached to a single output port (e.g., output port 134a) on the IP router 130 may process multiple channels of video from a plurality of sources (e.g., sources 110a and 110b), with a different source or destination multicast IP address.

As further shown, the IP router 130 includes a computer processing unit ("CPU") 138 with the memory 136 communicatively coupled thereto. In the exemplary aspect, the CPU or processor 138 servers as the port processor (there can be multiple port processors for each port) and is configured to perform the operations described herein using instructions stored in the associated memory 136. Alternatively or in addition, some or all of the operations described herein may be performed using dedicated electronic hardware. Moreover, although only one IP router 130 is illustrated in the exemplary embodiment, the system may comprise any number of switches IP routers 130 controlled by controller 140. Moreover, although controller 140 is illustrated as a separate component in the exemplary embodiment, controller 140 can be an internal component of IP routers 130 and/or part of CPU 138 according to alternative aspects.

According to the exemplary aspect, the IP router 130 includes one or more filters (not shown) that are coupled to the input ports 132a, 132b . . . 132n, respectively, and configured to parse the real-time transport protocol ("RTP") header information, as well as additional information, from each data packet. In general, each incoming packetized media stream received by IP router 130 comprises a plurality of data packets, with each packet having a header that includes multiple fields as well as the payload or data portion. As is known to those skilled in the art, the RTP packet header of each data packet will include a 32-bit synchronization time stamp (i.e., a "RTP time stamp").

According to the exemplary embodiment, the IP router is configured to parse the header information of each frame of the incoming packetized media stream received by each input port 132a, 132b . . . 132n, to parse the RTP header information. The RTP time stamp provides a true time value for each unique IP flow. Thus, for example, if the IP router 130 is implementing the AES-67 standard for audio-over-IP interoperability, or other future RTP standards, there may be multiple channels within a given RTP payload. Based on the RTP time stamp, these channels are bonded in time, and may be treated as one logical flow for the purposes of timing and routing.

By inspecting the RTP header and parsing the time stamp, the IP router 130 is configured to switch the data flow(s) at the point in time the time stamp value changes, or matches a target value. In general, specifications according to SMPTE 2110 and VSF TR-03, for example, are written such that the time stamp value for all payload media associated with a frame of video, shall have the same time stamp. Accordingly, a new frame has a new and specifiable time stamp at the start of each frame. According to the exemplary aspect, the IP router 130 is configured to identify a change in value of the RTP time stamp of a given data flow and execute a switch at that time. In an additional aspect, the IP router 130 is configured to perform the data flow switch at a specified RTP time stamp value, which could be unique to a group of signals. In yet another aspect, the IP router is configured to switch data flows with respect to a common "sync" value published to all the ports.

In order to perform the switch of data flows, the IP router 130 must change the algorithm for the packet forwarding. As described above, the IP router 130 includes memory 136. In the exemplary embodiment, the memory 136 can be any type of conventional electronic memory (e.g., RAM) that is configured to receive and store forwarding addresses for each received data packet. In this aspect, the memory 136 as part of IP router 130 can be considered part of the "data plane" (also known as the "forwarding plane"), which defines the component of the router architecture that controls how to route packets arriving on the inbound interface, i.e., input ports 132a, 132b . . . 132n. Moreover, in the exemplary embodiment, the data plane uses a table(s) from controller 140 in which the IP router 130 looks up the forwarding address of the incoming packet and retrieves the information necessary to determine the path from the input ports, through the internal forwarding fabric of the IP router 130, and to the proper outgoing interface, i.e., output/destination ports 134a, 134b . . . 134n. In other words, the IP router 130 uses the table as an index for the data flows and to signal when the IP router 130 (and more specifically, the port engine) should control the rerouting of the packetized media data from a first destination port to a second destination port.

Thus, according to the exemplary embodiment, the data (i.e., controller 140) is configured to transmit a command stream to the CPU 138, which functions as a "port engine" of IP router 130 in conjunction with memory 136. The command stream is a table that includes a forwarding address for each input port and a designated time stamp value, which can be ASAP ("as soon as possible") according to one aspect. The following Table 1 illustrates an exemplary command stream transmitted from controller 140 to CPU 138:

TABLE 1

| Forwarding Address | Time Stamp |
| --- | --- |
| Port$_a$, IP$_a$ | ASAP |
| Port$_b$, IP$_b$ | T = τ |
| Port$_n$, IP$_n$ | T = 2τ |

Thus, according to the exemplary aspect, the controller 140 transmits a command stream including this data table, for example, that defines the isochronous switching for packetized media received by each input port. It should be appreciated that Port$_a$ corresponds to input port 132a, Port$_b$ corresponds to input port 132b, and Port$_n$ corresponds to input port 132n. Moreover, IP$_a$ corresponds to output port 134a, IP$_b$ corresponds to output port 134b, and IP$_n$ corresponds to output port 134n.

The switch is defined by the RTP time stamp value defined in the command stream table. For example, the IP router 130 is controlled to switch the data flow received at Port$_a$ (i.e., input port 132a) to be routed to IP$_a$ (i.e., output port 134a) when the RTP time stamp of the received packetized media stream received at the input port 134a is new as a result of a new frame in the data stream. Advantageously, because the switch of the packet routing is triggered upon a detection of a change in the RTP time stamp (i.e., from the RTP header parsing discussed above), the switch effectively occurs during the vertical blanking interval switching point. Since the vertical blanking interval switching point contains no image data, the switch will not be perceived by viewers when the packets are decoded.

Figure 2:
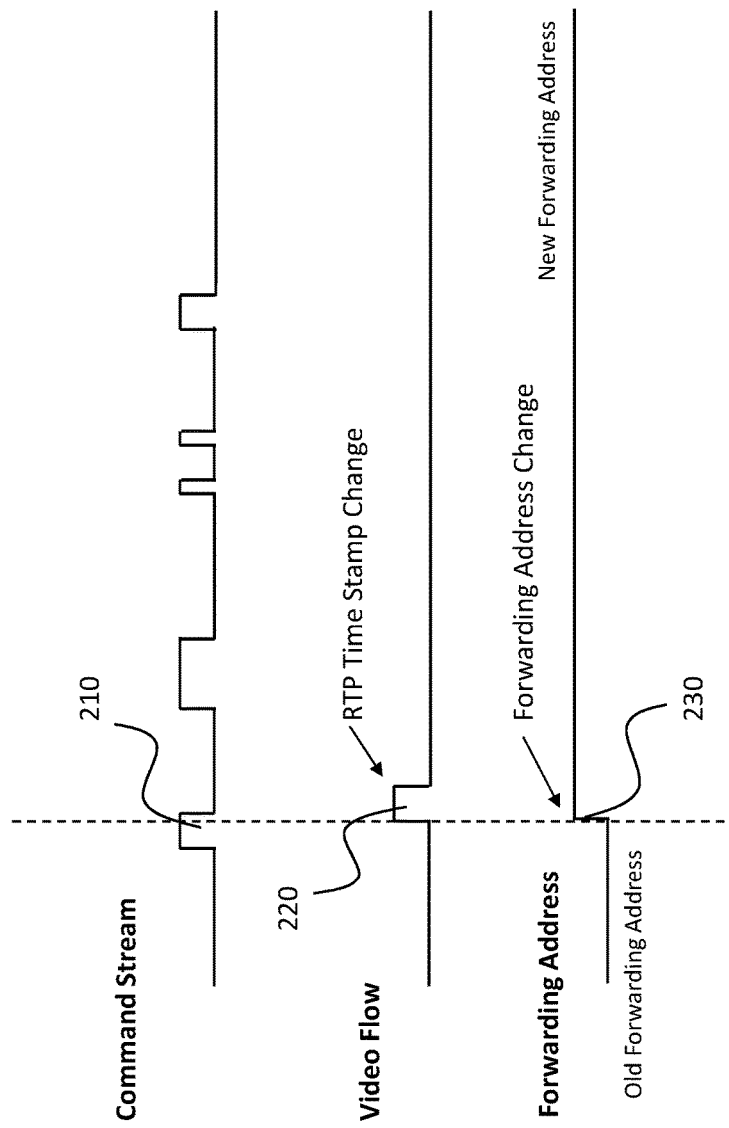
FIG. 2 illustrates a timing diagram for isochronous switching of packetized media according to an exemplary embodiment.

FIG. 2 illustrates a timing diagram for isochronous switching of packetized media according to an exemplary embodiment. As shown, the command stream is fed to the control plane asynchronously, which is then used to control the data plane. According to the exemplary aspect, the short commands indicate single address changes and the long duration commands indicate a burst of command. Moreover, it should be appreciated that if a command needs to occur at a specific time (e.g., it is desired for the switch to occur at the next change in RTP time stamp), the specific command must be sent in advance of that time since there is inherently a small amount of delay. Thus, as shown the command 210 must be sent in advance of the RTP time stamp change 220 if the switch is to be performed during that time stamp change. Thus, when the port engine detects a change in the RTP time stamp of the data flow received by the input port 132a, the forwarding address will change from the current or old forwarding address (e.g., output port 134a) to a new forwarding address (e.g., output port 134b). Again, it is reiterated that as described above, any type of data flow switch can be implemented using the algorithm described herein and the switch between two output ports shown in FIG. 2 is only one exemplary example.

Referring back to Table 1 shown above, the switch can also be made based on a specified time stamp value. In other words, if the RTP time stamp value matches a reference value defined in the command stream, which could be common for small groups, or the entirety of the IP router 130, the forwarding address(es) could change. As shown above, the RTP time stamp can be based on the time interval τ which can be considered the ideal duration interval of the video frame rate. Moreover, the system time can be synchronized according to a precision time protocol ("PTP") clock as will be discussed in more detail below. In this aspect, the time is transmitted via the PTP and locked to the epoch, meaning the clock is locked to an instant in time (t=n) serving as the reference point for the switch.

Figure 3:
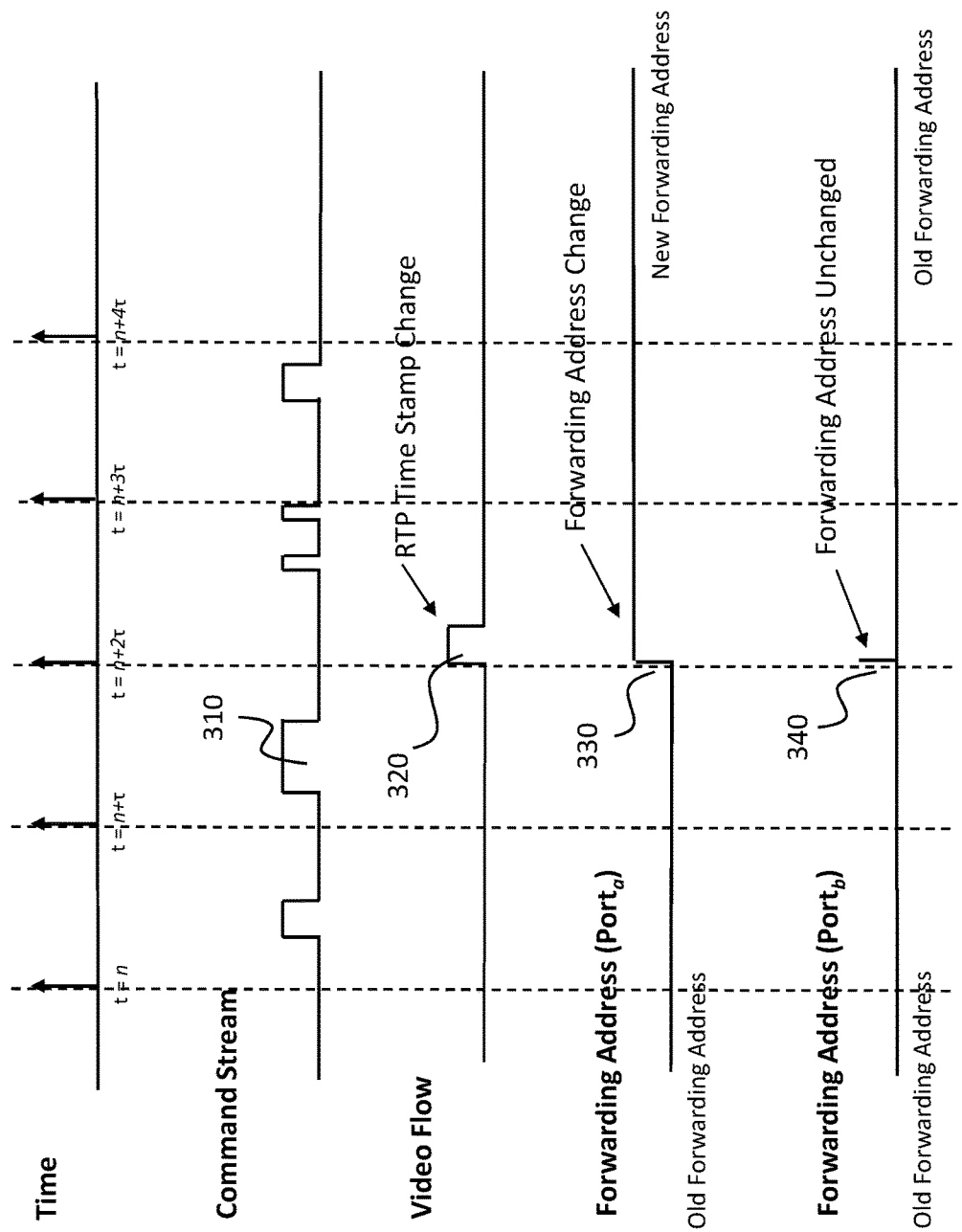
FIG. 3 illustrates another timing diagram for isochronous switching of packetized media according to an exemplary embodiment.

FIG. 3 illustrates another timing diagram for isochronous switching of packetized media according to an exemplary embodiment. As shown, the timing signal is driven by the PTP at intervals n (i.e., the epoch), n+τ, n+2τ, and so forth. In this example, the command stream is transmitted asynchronously, as described above, and includes burst of command signals 310. It is assumed that the command includes a specified time stamp for the forwarding address of Port$_a$ (i.e., input port 132a) of time stamp t=n+2τ. However, the command stream does not include a specified time stamp for the forwarding address of Port$_b$ (i.e., input port 132b). Thus, as shown, a RTP time stamp change 320 is detected at time t=n+2τ. Moreover, the forwarding address for Port$_a$ (i.e., input port 132a) is defined based on the command for the switch to be triggered at this detected RTP time stamp change. Thus, the packetized media stream received at this input port 132a is switched to a new forwarding address. However, at the same time, there is no specified time stamp value for Port$_b$ (i.e., input port 132b). As result, no switch is made and the current or old forwarding address is maintained for the packetized media stream being received at this input port 132b. Accordingly, the port engine is detecting the time value when the RPT time stamp changes and comparing this value to the specified time stamp value sent in the command stream. If the values match, the switch is made to the new forwarding address.

According to the exemplary embodiment, the forwarding by the IP router 130 occurs at the input port where the data plane gains access to the incoming packetized media stream. In certain aspects, some of the routing operations can be supported in the control plane. For example, some IP routers forward port data via the control plane to a secondary processor which is considered part of the control plane, for multi-cast replication, as an example. As described above, the forwarding addresses are managed correctly, based on the map table (e.g. Table 1) stored in the hash or ternary CAM ("TCAM") of the memory of the control plane, and replicated flows are then forwarded to all the necessary ports in the IP router 130.

Figure 4A:
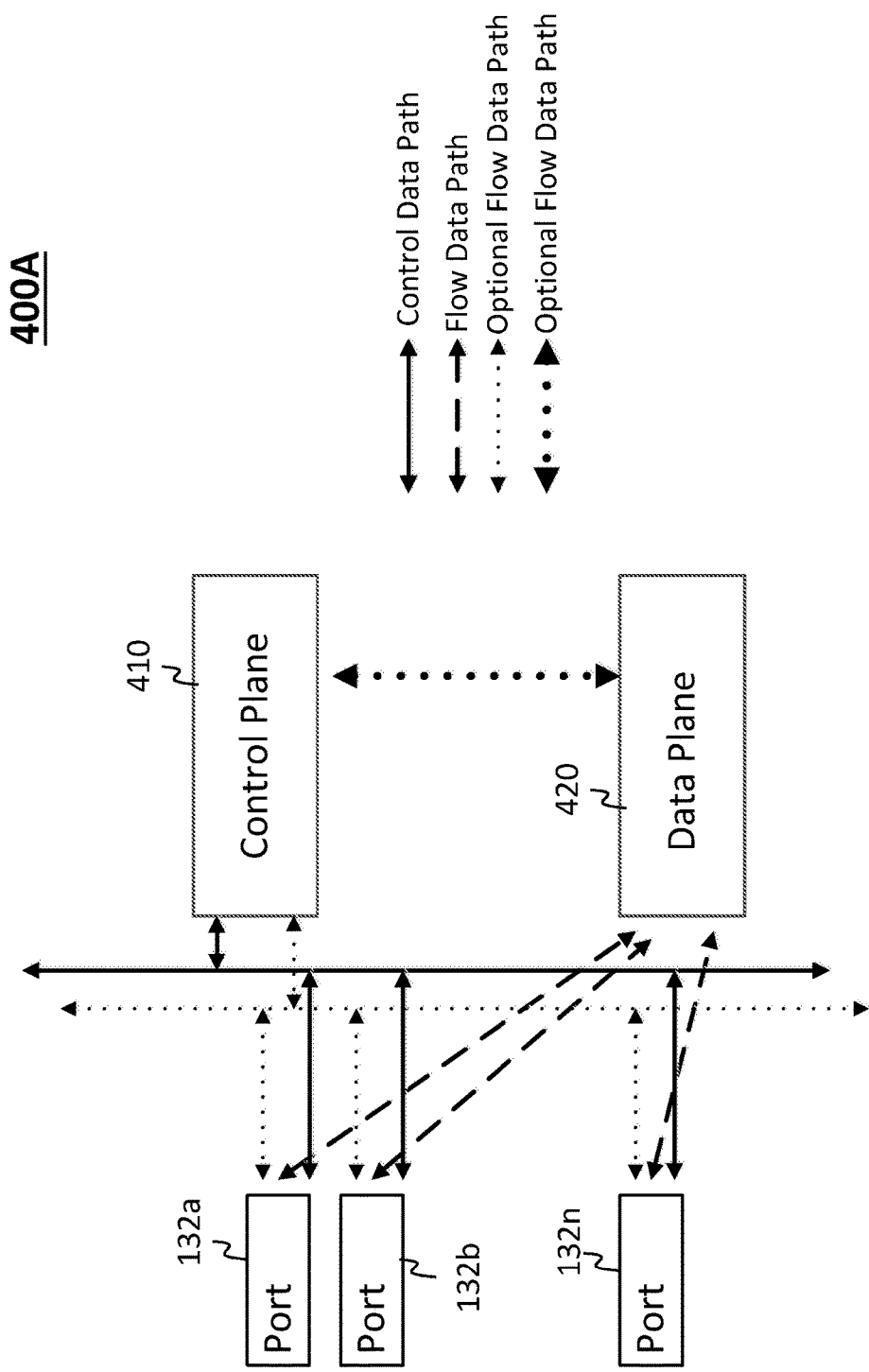
FIG. 4A illustrates a flow diagram of the control and data paths for isochronous switching of packetized media according to an exemplary embodiment.

FIG. 4A illustrates a flow diagram of the control and data paths for isochronous switching of packetized media according to an exemplary embodiment. More particularly, the diagram provides a conceptual representation of the communication paths in the system, and, specifically, the controller 140 and IP router 130, shown in FIG. 1 and described above.

As shown, the diagram 400A includes a plurality of the input ports, illustrated as input ports 132a, 132b . . . 132n, for example. Moreover, the control plane 410 is provided to transmit control plane packets (i.e., the control data) to the ports 132a-132n to control how incoming packetized data packets are routed by IP router 130 to designated destinations. As described above, the hardware components provided to implement the control plane functions can include controller 140 and/or CPU 138, which can be separate components or a single component. The control plane data is provided to configure the ports to perform the isochronous switching of packetized media as described herein. Thus, the control plane maintains the address map that includes the forwarding addresses for the received packetized media streams so that the data can be accessed and routed as it moves through the IP router 130, shown as data flows.

Moreover, the data plane 420 represents the router architecture that controls how the packetized data (i.e., the flow data) is routed through IP router 130 after packets arriving on the inbound interface, i.e., input ports 132a, 132b . . . 132n. As described above, the data plane uses the table provided by the control plane 410 in which the IP router 130 looks up the forwarding address of the incoming packet and retrieves the information necessary to determine the path from the input ports, through the internal forwarding fabric of the IP router 130, and to the proper outgoing interface (e.g., output ports 134a, 134b . . . 134n). The data plane 420 of the system 400A can include memory buffer, crosspoint switches, and other hardware components (not shown) found in conventional IP routers, as would be understood to one skilled in the art, to effectuate the physical routing of the media streams to the designated destination devices. Moreover, optional flow data paths between the input ports 132a, 132b . . . 132n and the control plane 410 and between the control plane 410 and the data plane 420 can be provided to facilitated replication of data signals as would be appreciated to one skilled in the art.

Figure 4B:
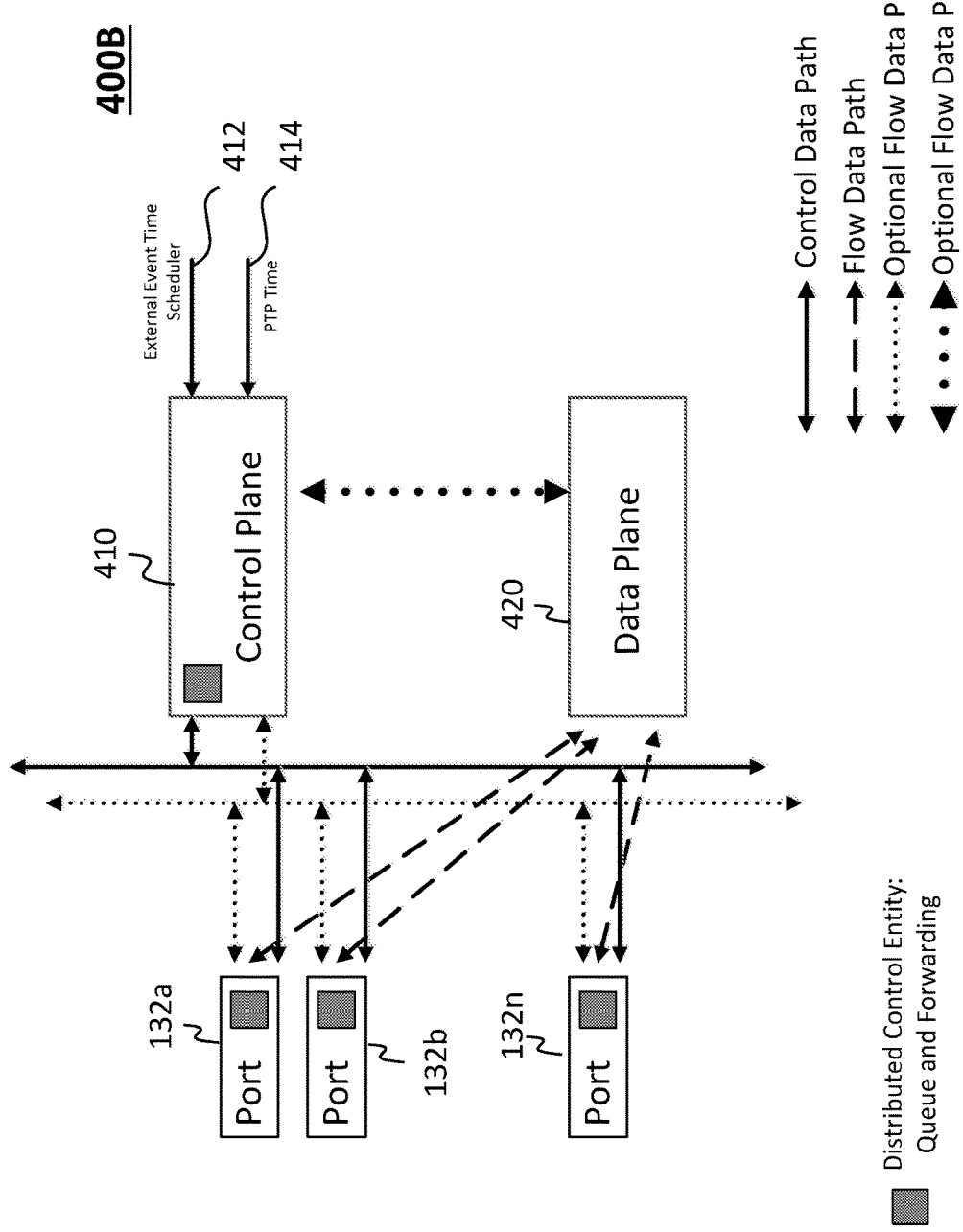
FIG. 4B illustrates a more detailed example of the flow diagram shown in FIG. 4A for isochronous switching of packetized media according to an exemplary embodiment.

FIG. 4B illustrates a more detailed example of the flow diagram shown in FIG. 4A for isochronous switching of packetized media according to an exemplary embodiment. As shown, the primary components illustrated are the same as that described above with respect to FIG. 4A and will not be repeated herein. However, as further shown, the control plane 410 receives an external event time scheduler signal 412 and a PTP time synchronization signal 414. More particularly, in the exemplary embodiment, the control signals to perform the media switching functions of the IP router 130 can be Software-Defined Network ("SDN") commands and/or Internet Group Management Protocol ("IGMP") commands to acquire date by a specific input port. These signals are received by the controller 140 and interpreted as part of the external event time scheduler signal 412. Thus, these signals may define when the switch should be made, i.e., when the next RTP time stamp change is detected or at a specified RTP time stamp change, as discussed above.

Moreover, the control plane 410 is driven by the PTP time signal 414. In general, precision time protocol ("PTP") enables precise synchronization of clocks over a data packet network. PTP is defined in the IEEE-1588-2008 standard entitled "Standard for a Precision Clock Synchronization Protocol for Networked Measurement and Control Systems," which is hereby incorporated by reference. Simply put, PTP is used to distribute a "grandmaster" clock's precise time-of-day to slave clocks, such as the internal clock used to drive the control plane 410. This is done using an exchange of PTP packet timestamps. Accordingly, the control plane 410 receives the PTP time signal as a reference signal. Based on proposed and existing standards and specifications, the RTP time stamps of the packetized media streams are related to the PTP time stamps of the external reference signal. The controller 140 (i.e., the control plane 410) is configured to use this information to pre-queue commands itself, or distribute time referenced commands to the data plane port queue processors. In one aspect, the input ports 132a-132n would themselves be fed a copy of the external reference clock 414. According to an exemplary aspect, the PTP packets are processed according to conventional techniques, as defined by the IEEE and SMPTE standards, to produce the equivalent of video timing signals such as vertical interval indication, or horizontal start of line indication. In the exemplary aspect, the actual value of the PTP time stamp is used to indicate these identical events. In this way, video formats of different frequency or format can be easily switched by a common clock. Also, other signals such as audio and ancillary data may be switched at a given time stamp value. By using the PTP time stamp value, it is now possible to switch any stream, or flow, or group thereof, at a uniquely identified point in time, coherently and isochronously with respect to their common time base because they are tied to the EPOCH as defined by IEEE 1588 and SMPTE 2059. Additionally, when signals are known to be locked to the EPOCH, it is possible to calculate the PTP time stamp value based on being give a time of day value, such as 12:00 noon, GMT—9 hours. This aspect provides the ability to bridge between scheduling software which more easily operates on time of day.

Due to scale requirements, and other control plane response considerations, the switching of received packetized media streams is considered to occur at the incoming ports 132a-132n according to the exemplary embodiment. Thus, as shown, the control plane 410 uses the external event time scheduler signal 412 to generate the command stream (discussed above), which is delivered according to the PTP clock signal 414 as a short, event queue to all input ports. As a result, the traffic management for the incoming data is pushed to the ports and distributed throughout the IP router 130, rather than locally at the control plane 410. FIG. 4B illustrates this distributed traffic management as being distributed control entities at ports 132a-132n for providing queue and forwarding functions as described above. Advantageously, the distributed control provides a quicker and more efficient system for managing and routing incoming packetized media streams, particularly as the number of ports for the IP router 130 increases. Moreover, this design enables the incoming ports to act autonomously to carry out commands that are both in and/or out of band.

As described above, the control signals to perform the media switching functions of the IP router 130 can be SDN commands (e.g., OPENFLOW protocol) and/or IGMP commands, for example. In the embodiment in which the data plane 420 of the IP router 130 is controlled by an SDN, the forwarding address tables generated by controller 140 should be formatted to ensure that any required leave commands (i.e., where a destination port drops a source) are executed before any join commands (i.e., where the destination port adds a new source). In this embodiment, the required forwarding addresses of the source(s) no longer needed should be removed from the respective source port (i.e., the input ports 132a-132n) forwarding tables by direct command from the control plane 410, rather than as part of the IGMP command sequence.

Figure 5:
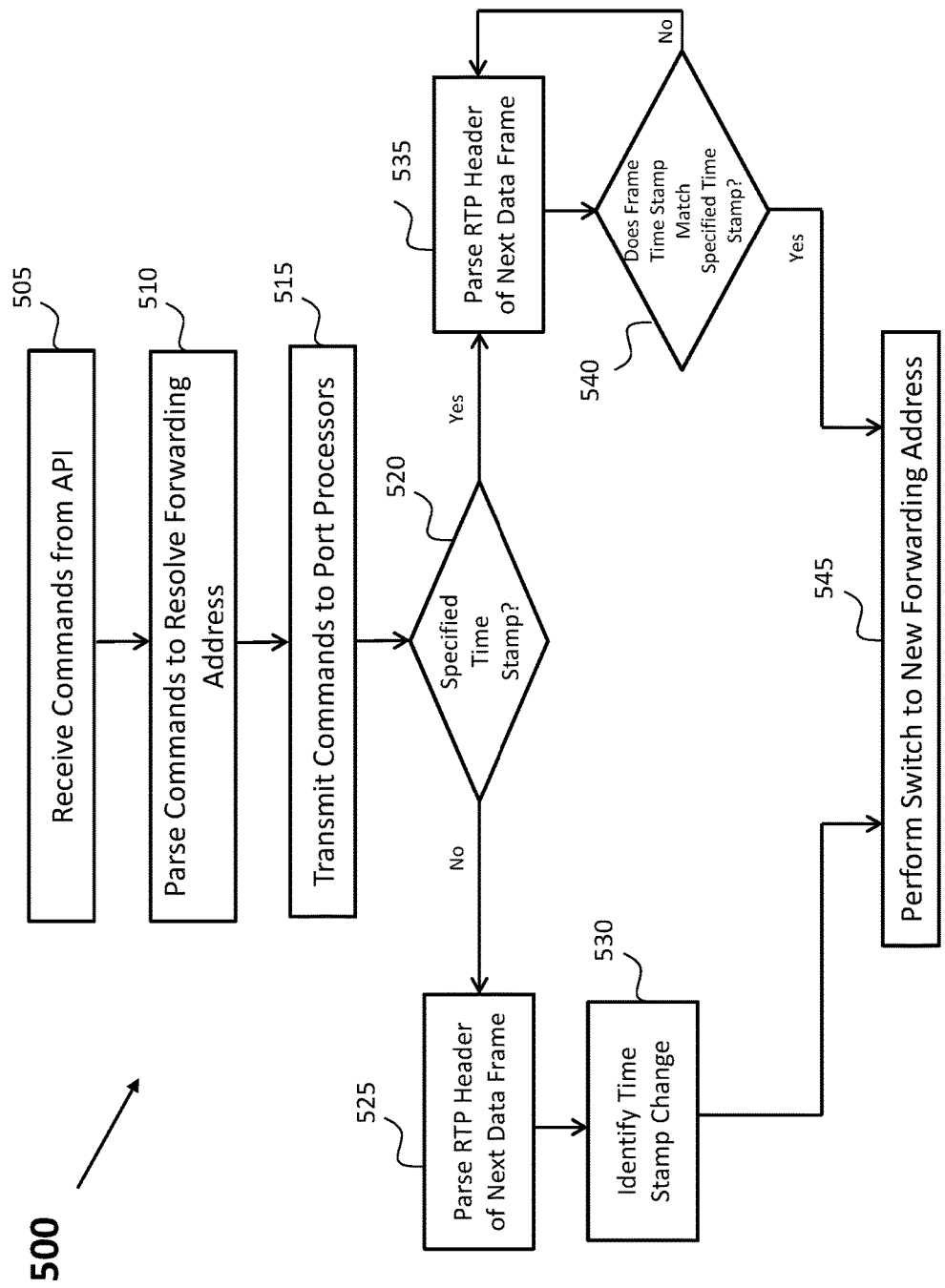
FIG. 5 illustrates a flowchart for a method for isochronous switching of packetized media according to an exemplary embodiment.

FIG. 5 illustrates a flowchart for a method for isochronous switching of packetized media according to this exemplary embodiment. As shown, initially at step 505, the control plane 410 (e.g., controller 140) receives commands from a south bound application program interface ("API") to perform one or more switches. As described above, these commands can be received as external event time scheduler signals 412. Next, at step 510, the control plane 410 parses these commands to determine/resolve the forwarding addresses for the packetized media streams being received by IP router 130. The control plane 410 then creates/defines the forwarding address table(s) and transmits these command streams to one or more processors (e.g., CPU 138) of the input ports 132a-132n. It should be understood that certain data sources may need to be dropped and certain data sources may need to be added to the input ports. This information is communicated over the control plane 410, to the port processors of the data plane 420.

As described above, the exemplary embodiment considers two types of switch/take commands: switch/take immediately (i.e., "ASAP") and switch/take at a specified time stamp. As shown at step 520, the CPU 138 determines based on the forwarding addresses included in the command stream whether there is a specified time stamp or whether the switch should occur ASAP.

As explained above, based on existing and proposed specifications and standards, the RTP time stamp for an image frame shall change at the beginning of that image, and shall remain unchanged for the duration of that image frame (i.e., verify Frame=field 1 and field 2). Therefore, the ideal switch point is when the RTP time stamp of a packetized media stream changes, as this change indicates the start of the new frame. Accordingly, at step 525 the RTP parser of the input port (e.g., input port 132a) parses the header information of the incoming packetized media stream and identifies a time stamp change at step 530. Upon detection of this next time stamp change, the CPU 138 of the data plane 420 proceeds to step 545 and performs the switch to the new forwarding address for the incoming media stream received by the input port 132a. For example, at this instant, the port table in memory 136 deletes the old forwarding address(es) (e.g., multiple addresses can be defined in a multicast environment) and stops forwarding signals to that address(es). At the same time, the CPU 138 adds the new forwarding address(es) defined by the command stream from the control plane 410 and starts forwarded the incoming media signals to the new forwarding address(es). It should be appreciated that in one aspect, the forwarding address to delete and the forwarding address to add could be in the same table, and then only the action is taken at the appropriate time. Moreover, in another aspect, the memory 136 can be provided as a double buffer memory that can contain the current and next forwarding address additions and deletions. Upon the trigger event being true (e.g., detection of the next change in RTP time stamp of the media stream), the preset buffer items are transferred to the current buffer and the state is changed.

As further described above, the switch point can be further qualified such that the switch occurs when the RTP time stamp value changes and the RTP time stamp value equals a given trigger value. This is shown in step 520 when the port processor (e.g., CPU 138) detects a specified time stamp for the switch. In this case, the process proceeds to step 535, which, similar to step 525, parses the RTP header information to detect the next change in the RTP time stamp value. The port processor then determines at step 540 whether the RTP time stamp matches the specified or trigger value. If so, the method proceeds to step 545 and performs the switch as described above. If not, the method returns to step 535 and parses the next data frame to detect the next RTP time stamp. This process repeats until the trigger event is detected by the port processor.

As further described above, the exemplary embodiment can be implemented for IP routers using IGMP, which is an in-band signaling protocol that acts to provide the control plane 410 with all the same information as would have otherwise been provided by the external SDN. In general, an IGMP command sequence includes two principle steps. First, there is a leave request, where the destination port drops a source. Then, there is a join command, where the destination port adds a new source. Under normal operations, the destination port (e.g., output port 134a) requests to first leave one stream and then join another stream. Upon the request to leave a stream, the source port (e.g., input ports 132a) for that stream immediately drops the requesting destination from its forwarding address and stops forwarding packets. Then, upon the request to join a new stream, a new source port (e.g., input ports 132b) begins forwarding the stream to the destination port (e.g., output port 134a). In this example, the control plane 410 brokers this transaction and records the addresses in the HASH or T-CAM, for example. One obvious limitation is that there is a gap exists where there is no flow of information, and, therefore, there is a break in data received by the destination port (e.g., output port 134a) and destination device coupled thereto.

According to the exemplary embodiment, the control plane 410 described herein is modified so that the command is logically executed, but not actually executed until the control plane 410 monitors the leave and join protocol for completion at both ports. Then, the switch command is executed simultaneously with respect to stream flow for all ports in the same manner as if the SDN operation described above with respect to FIG. 5 had occurred.

In general, it is noted that existing media IP routers use memory buffers at the ports to manage traffic flow and shaping. These buffers can smooth the transition between streams at the destination ports to accommodate underlap and overlap. Because the streams are isochronous, the buffer can be designed to ensure appropriate memory depth based on the time interval, the network transport velocity (i.e., the bit rate) and the traffic shape (i.e., burstiness).

Moreover, existing media routers are multi-stage architectures with more than the minimal number of crosspoints and connectors between interstages in order to provided non-blocking with multicast. In this case, there can arise the need to re-path certain routes to find room around blocks in the connectors between stages. In such event, these re-routes are calculated by the control plane 410, and commands are fed to the port processor at the data plane 420 as before.

In one aspect, the described system and method can be implemented for three stage routers (i.e., a leaf and spine architecture) in which each leaf and spine router provides the same capabilities as described herein. Thus, the disclosed algorithm is carried out by each stage, and the system provides the same overall capability. Because the take or switch commands occur based on the RTP time stamp change, which is frame accurate, re-pathing does not cause an interruption to the coherent video signal as would be appreciated to one skilled in the art.

Figure 6:
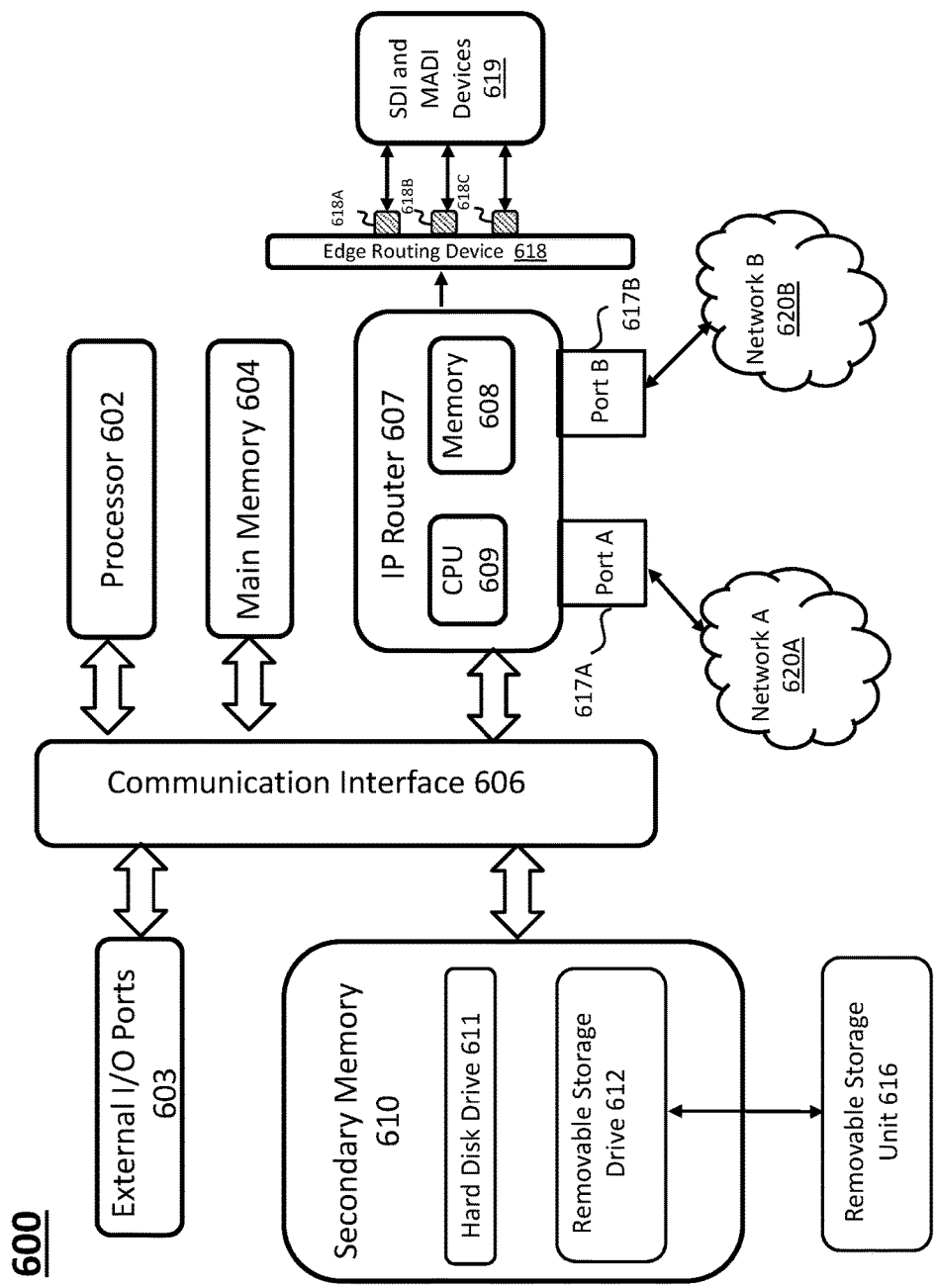
FIG. 6 illustrates a high-level block diagram of a system for isochronous switching of packetized media according to an exemplary embodiment.

FIG. 6 illustrates a high-level block diagram of a system for isochronous switching of packetized media according to an exemplary embodiment. As shown, the system 600 includes a an IP router 607 that can correspond to IP router 130 discussed above. In general, the components of the receiver that are described herein can be implemented as FPGA code, but can also be implemented through a combination of hardware and software components. In addition, as shown, the IP router 607 can include control circuitry, which can be CPU 609 (corresponding to CPU 138) and memory 608 (corresponding to memory 136), for example. CPU 609 can be any type of computer processor, such as a microprocessor, or the like, as known to those skilled in the art, that is configured to control IP router 130 using the algorithms and operations shown above.

Moreover, the CPU 609 is configured to control the input ports A and B denoted by 617A and 617B. The ports A and B can correspond to the input ports described above, such as ports 132a-132n. As shown, each port A and B has one or more outputs coupled to receiver IP router 607. Moreover, the ports A and B are communicatively coupled to IP networks A and B (denoted by 620A and 620B) as would be understood to one skilled in the art in which the input ports can receive the packetized media streams from sources 110a-110n, for example.

The IP router 607 includes an output coupled to an edge routing device 618 that can route the switched and outputted media streams to one or more SDI and MADI devices 819 by a plurality of input/output ports 818A, 818B and 818C (corresponding to output ports 134a-134n, in one example). Moreover, in an exemplary aspect, the IP router 607 and edge routing device 618 are a single device.

In addition, FIG. 6 illustrates additional various hardware components and other features, for use in accordance with aspects presented herein. Aspects presented herein may be implemented using hardware, software, or a combination thereof and may be implemented in one or more computer systems or other processing systems. Thus, according to an exemplary embodiment, system 600 may also include one or more processors, such as processor 602, which can correspond to controller 140 and can be separate to receiver 607 or, alternatively, correspond to CPU 609 and be a component of IP router 607 or a standalone processor in one embodiment. In either event, the processor 602 is connected to a communication interface 606 (e.g., a communications bus, cross-over bar, or network). Various software implementations are described in terms of this example computer system. The communication interface 606 includes a number of input/output ports 603 that can receive external signals, such as PTP clocking signal 414 and the external event time scheduler signals 412.

By way of example, an element, or any portion of an element, or any combination of elements may be implemented with a "processing system" that includes one or more processors. The processing system further includes one or more modules for executing the algorithms described herein. The modules may be software modules running in the processor 602 and/or CPU 609, resident/stored in memory 610, e.g., a computer readable medium, one or more hardware modules coupled to the processor 602, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 600 also includes a main memory 604, preferably random access memory (RAM), and may also include a secondary memory 610. The secondary memory 610 may include, for example, a hard disk drive 6110 and/or a removable storage drive 612, representing a floppy disk drive, a magnetic tape drive, an optical disk drive, etc. The removable storage drive 612 reads from and/or writes to a removable storage unit 616 in a well-known manner. Removable storage unit 616, represents a floppy disk, magnetic tape, optical disk, etc., which is read by and written to removable storage drive 612. As will be appreciated, the removable storage unit 816 includes a computer usable storage medium having stored therein computer software and/or data.

In alternative implementations, secondary memory 610 may include other similar devices for allowing computer programs or other instructions to be loaded into computer system 600. Examples of such may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 610 to computer system 600. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer programs (also referred to as computer control logic) are stored in main memory 604 and/or secondary memory 610. Such computer programs, when executed, enable the computer system 600 to perform the features of the aspects discussed herein. In particular, the computer programs, when executed, enable the processor 602 to perform the features of the presented herein. Accordingly, such computer programs represent controllers of the computer system 600.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 600 using removable storage drive 612, or hard drive 611, for example. The control logic (software), when executed by the processor 602, causes the processor 602 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

Aspects may also be implemented using a combination of both hardware and software. Accordingly, in one or more example aspects, the functions described may be implemented in hardware, software, firmware, or any combination thereof. Moreover, while the IP router is described as a packet switching device in the exemplary embodiment, it should be understood that the switching can be implemented by any processing device, such as a smartphone, laptop, personal computer, or the like, with suitable processing, communication and input/output capabilities.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A method for isochronous switching of a packetized media stream, the method comprising:
   receiving at least one packetized media stream by an input port of an IP packet router, the at least one packetized media stream comprising a plurality of frames each containing video data;
   routing, by the IP packet router, the received at least one packetized media stream to a first output port of a plurality of output ports of the IP router;
   parsing, by the IP packet router, RTP header information in each frame of the at least one packetized media stream to identify respective RTP time stamps in each frame;
   determining a change in the RTP time stamp between two consecutive frames in the at least one packetized media stream;
   comparing a value of the respective RTP time stamp with a trigger value when a change is determined in the RTP time stamp between the two consecutive frames; and
   rerouting the at least one packetized media stream by switching from the first output port of the IP packet router to a second output port of the plurality of output ports when the value of the RTP time stamp matches the trigger value.

2. The method according to claim 1, further comprising receiving, by the IP packet router, a command stream that indicates a new forwarding address associated with the second output port of the plurality of output ports of the IP packet router.

3. The method according to claim 2, wherein the rerouting of the at least one packetized media stream comprises replacing a current forwarding address for the at least one packetized media stream with the new forwarding address.

4. The method according to claim 2, wherein the command stream associates the trigger value with the new forwarding address associated with the second output port of the IP packet router.

5. The method according to claim 4, wherein the trigger value is based on a precision time protocol synchronization signal.

6. An IP packet router for isochronous switching of a packetized media stream, the IP packet router comprising:
   at least one input port configured to receive at least one packetized media stream comprising a plurality of frames each containing video data;
   a plurality of output ports communicatively coupled to a destination device; and
   at least one RTP parser coupled to the at least one input port and configured to parse RTP header information in each frame of the at least one packetized media stream to identify respective RTP time stamps in each frame; and
   a data stream routing controller configured to:
      route the received at least one packetized media stream to a first output port of the plurality of output ports,
      determine a change in the RTP time stamp between two consecutive frames in the at least one packetized media stream,
      compare a value of the respective RTP time stamp with a trigger value when the change of the RTP time stamp is detected;
      reroute the at least one packetized media stream by switching from the first output port to a second output port of the plurality of output ports when the value of the RTP time stamp matches the trigger value.

7. The IP packet router according to claim 6, further comprising memory configured to store a data table indicating a new forwarding address associated with the second output port of the plurality of output ports of the IP packet router.

8. The IP packet router according to claim 7, wherein the data stream routing controller is further configured to control the rerouting of the at least one packetized media stream by replacing a current forwarding address for the at least one packetized media stream for the at least one packetized media stream with the new forwarding address.

9. The IP packet router according to claim 7, wherein the data table associates the trigger value with the new forwarding address associated with the second output port of the IP packet router.

10. The IP packet router according to claim 9, wherein the trigger value is based on a precision time protocol synchronization signal.

11. The IP packet router according to claim 6, wherein a request for the rerouting of the at least one packetized media stream to the second output port is based on at least one of an IGMP command and an SDN command.

12. A system for isochronous switching of a packetized media stream, the system comprising:
a controller configured to generate a command stream to control the isochronous switching; and
an IP packet router communicatively coupled to the controller to perform the isochronous switching based on the command stream, the IP packet router including:
at least one input port configured to receive at least one packetized media stream comprising a plurality of frames each containing video data;
a plurality of output ports communicatively coupled to a destination device;
at least one RTP parser coupled to the at least one input port and configured to parse RTP header information in each frame of the at least one packetized media stream to identify respective RTP time stamps in each frame; and
a data stream routing controller configured to:
route the received at least one packetized media stream to a first output port of the plurality of output ports,
determine a change in the RTP time stamp between two consecutive frames in the at least one packetized media stream,
compare a value of the respective RTP time stamp with a trigger value when a change is determined in the RTP time stamp between two consecutive frames, and
reroute the at least one packetized media stream from the first output port to a second output port of the plurality of output ports when the value of the RTP time stamp matches the trigger value.

13. The system according to claim 12, wherein the controller is configured to transmit the command stream as a data table that includes the trigger value and a new forwarding address for the second output port of the IP packet router that is associated with the trigger value.

14. The system according to claim 13, wherein the data stream routing controller of the IP packet router is further configured to control the rerouting of the at least one packetized media stream by replacing a current forwarding address for the at least one packetized media stream with the new forwarding address.

15. The system according to claim 14, wherein the controller generates the trigger value based on a precision time protocol synchronization signal.

16. The system according to claim 15, wherein the controller generates the command stream for the rerouting the at least one packetized media stream to the second output port based on at least one of an IGMP command and an SDN command.

* * * * *